Feb. 7, 1967     J. R. MONTGOMERY     3,302,837
FISH CARRIER
Filed May 20, 1965
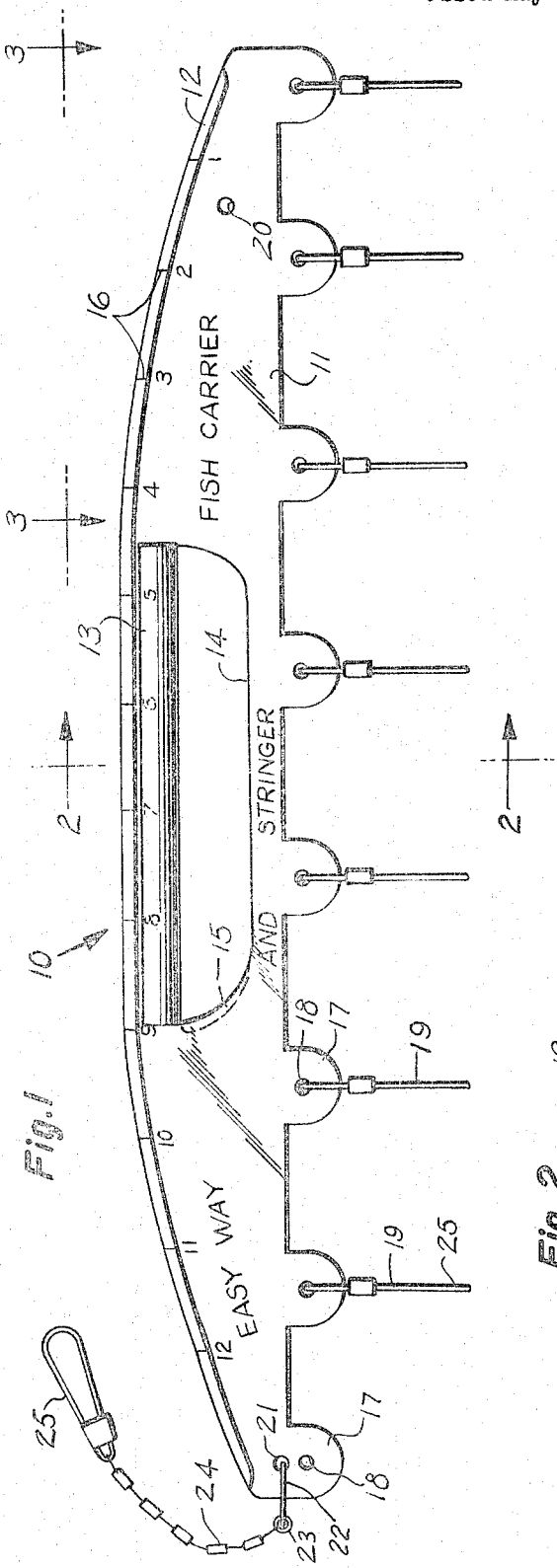
INVENTOR
*Jack R. Montgomery*

3,302,837
FISH CARRIER

Jack R. Montgomery, 2035 W. Washington Ave., San Bernardino, Calif. 92405
Filed May 20, 1965, Ser. No. 457,320
2 Claims. (Cl. 224—46)

This invention relates to fishing tackle accessories, and more particularly a fish carrier for use by sports fishermen.

It is an object of this invention to provide a fish carrier which will have a metallic body of an elongated configuration and will have a handle which will be die punched and rolled upwards to form a handle grip.

Another object of this invention is to provide a fish carrier which will have a plurality of extensions along the lower edge that will have clips fastened to them that may be inserted into the fish's mouth and thus hang the fish from the device.

Another object of this invention is to provide a fish carrier which will not only carry fish but will also hold fish in the water.

Still another object of this invention is to provide a fish carrier that will also serve as a measure to indicate the length of a fish.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing:

FIGURE 1 is a side view of this invention.

FIGURE 2 is a cross-sectional view taken along the lines 2—2 of FIGURE 1 and viewed in the direction of the arrows.

FIGURE 3 is a view taken along the lines 3—3 of FIGURE 1 and viewed in the direction of the arrows.

According to this invention, a fish carrier device 10 is provided with an elongated metallic body 11 having a lip 12 bent along its upper extremity. A handle 13 is die punched through body 11 and is bent upwards to provide a comfortable hand grip and an opening 14 left after die punching handle 13 provides a means for the fingers of the fisherman to be received within body 11. A lip 15 is bent from opening 14 at one end and provides greater rigidity for body 11 along with lip 12 of body 11. A plurality of spaced apart graduations 16 engraved upon lip 12 are indicated by numerical characters and provide a means of indicating the length of the fish. A plurality of rounded extensions 17 are spaced apart along the lower edge of body 11 and are provided with openings 18 which freely receive a clip 19 which may be opened to insert into a fish's mouth in order that the fish may depend from body 11 of carrier 10. An opening 20 through body 11 provides a means for receiving an extra clip 19 or may be used to hang fish carrier 10 from a fastener upon a wall etc. An opening 21 through body 11 freely receives an eye or swivel 22 and the other end of swivel 22 is provided with a ring 23 to which a chain 24 and a clip 25 are attached. The chain 24 and clip 25 provide means for securing the device 10 to a boat or other tackle in the boat, whereby the device may be trailed in the water to keep the fish alive, and the fish are prevented from escaping.

In use, clips 19 are opened in the well known manner as will be seen in FIGURE 2 of the drawing and the fish is placed thereupon. The fish are carried spaced apart along the body 11 by means of the clips 19 and the fisherman grasps the handle 13 and may thus proceed to carry the fish home.

What I now claim is:

1. A fish carrier and stringer device comprising an elongated metallic body, having a plurality of clips for depending fish therefrom, and handle means for carrying said device, the upper edge of said body being arcuate in configuration and provided with a lip from the front to the rear of said body and said lip is bent over and provides stiffening for strength of said body and spaced apart graduations upon said lip of said body provides a quick reference indicator as to the length of the fish when said fish is laid alongside of said body of said device.

2. A fish carrier and stringer device comprising an elongated metallic body, having a plurality of clips for depending fish therefrom, and handle means for carrying said device, a plurality of extensions integral of said body at the lower extremity of said body, each extension being provided with an opening through which is received an individual clip which may be opened to receive the mouth of a fish in order that said fish may be depended from said body of said carrier device and swivel means connected to a chain and an additional clip at one end of said chain of said carrier device provides a means of securing said device to a boat or other tackle in the boat in order that the fish secured to said clips of said extensions of said body may be prevented from escaping when attached to said device in the water.

References Cited by the Examiner

UNITED STATES PATENTS

| | | | |
|---|---|---|---|
| 1,212,087 | 1/1917 | Mikell | 224—7 |
| 1,498,247 | 6/1924 | Stewart | 224—57 X |
| 1,985,571 | 12/1934 | Hetzel | 224—45 |
| 2,426,298 | 8/1947 | Davy | 224—7 |
| 2,427,715 | 9/1947 | Cooper | 224—7 |
| 2,796,209 | 6/1957 | Holmes | 224—7 |

GERALD M. FORLENZA, *Primary Examiner.*

F. WERNER, *Assistant Examiner.*